H. LEAP.
RESILIENT WHEEL.
APPLICATION FILED MAR. 25, 1912.

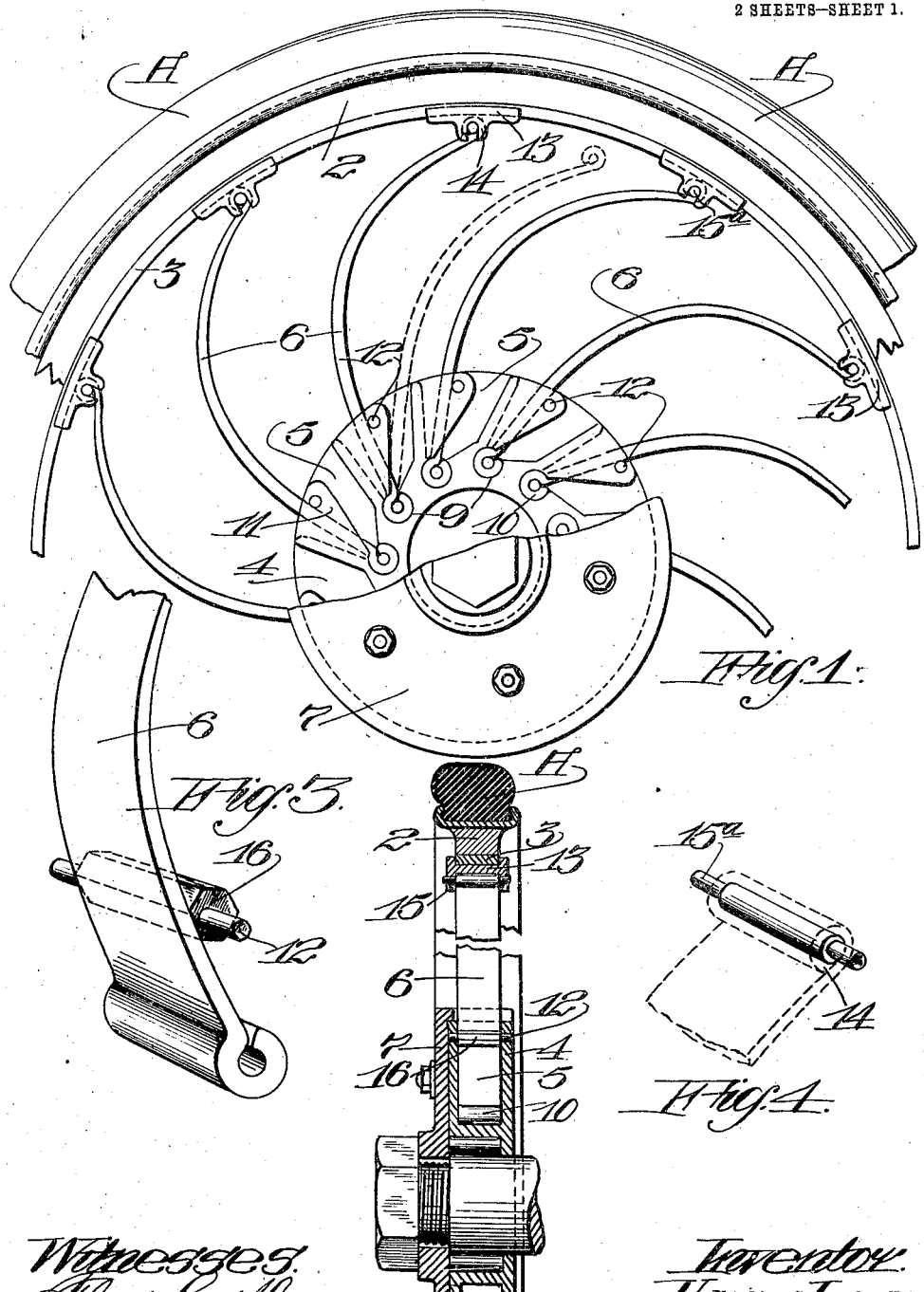

1,066,124.

Patented July 1, 1913.

2 SHEETS—SHEET 2.

Witnesses.
Thos. Castberg.
A. S. Berry.

Inventor.
Harry Leap.
by G. H. Strong.
Atty.

UNITED STATES PATENT OFFICE.

HARRY LEAP, OF CHICAGO, ILLINOIS.

RESILIENT WHEEL.

1,066,124.
Specification of Letters Patent.
Patented July 1, 1913.

Application filed March 25, 1912. Serial No. 685,944.

*To all whom it may concern:*

Be it known that I, HARRY LEAP, a citizen of the United States, residing at Chicago, in the county of Cook and State of Illinois, have invented new and useful Improvements in Resilient Wheels, of which the following is a specification.

My invention relates to improvements in wheels, and especially wheels that are designed for use upon vehicles which are driven by a self-contained motor, in which the power is applied directly through an axle against the friction of the wheel upon the ground.

It comprises a novel arrangement of a hub and rim with intermediate, curved, spring steel spokes, means for connecting said spokes with the hub and the rim, means for varying the tension of the spokes to suit the load to be carried upon the wheels, and in details of construction, which will be more fully explained by reference to the accompanying drawings, in which—

Figure 5:
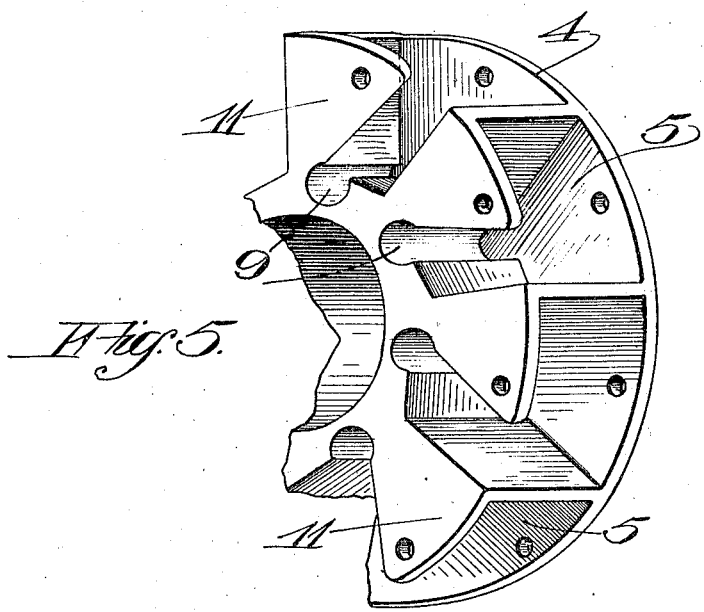
Figure 6:
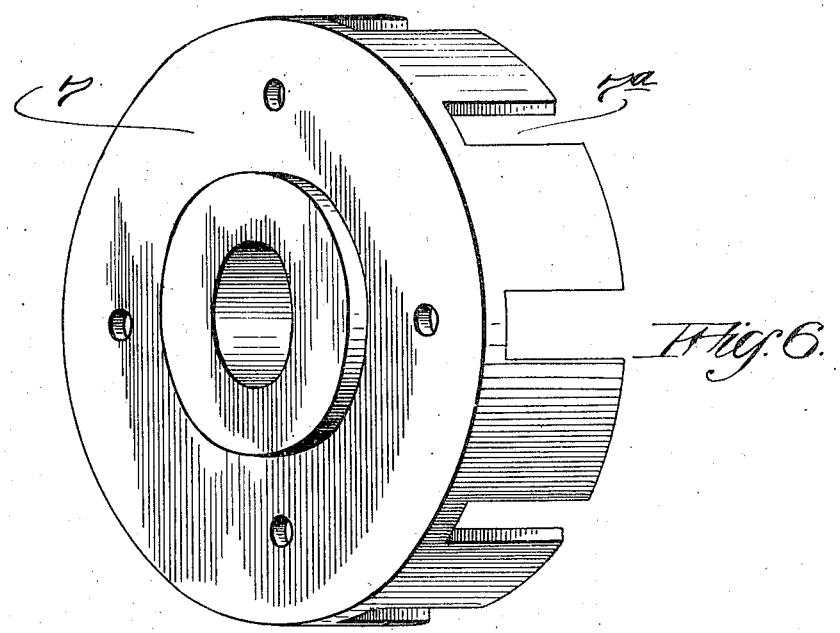

Figure 1 is a side elevation of the wheel partly broken away. Fig. 2 is a cross section of same. Fig. 3 is a perspective view of the spring spoke and tension adjusting polygonal sleeve. Fig. 4 is a similar view of the outer end of the spoke and retaining pin. Fig. 5 is a perspective view of the hub portion partly broken away. Fig. 6 is a similar view of the outside cap plate.

The rim of the wheel may be of any suitable construction. I have here shown it as comprising a clencher or other suitable circumferential portion adapted to contain a tread which may be of solid rubber or other suitable tough and elastic material. To this outer portion A is fitted a felly 2 preferably of wood, and to this felly is secured a track of cold rolled steel 3, the object of which will be more fully described hereafter. The hub portion of the wheel has fitted to it flanges designed to carry the inner ends of the spokes. These flanges consist of fixed disk portions 4 having cast or formed with them approximately radial chambers, as at 5, adapted to receive and hold the inner ends of the springs 6. Upon the opposite side is a plate or cap 7, which completes the flange structure. This cap is slotted at 7ª to admit the spokes. The inner ends of these chambers 5 have a segmental curvature forming pockets 9, and the springs 6 have the inner ends bent into a curve, as shown at 10, this curve fitting within the pockets 9 and being sufficient to retain the inner ends of the springs in their places. The springs may be introduced from the side, by the curvature 10 slipping into the pocket 9 and being thus firmly held in place and at the same time allowed to rotate to a certain extent. The chambers 5 are inclosed by projecting lugs 11, formed upon one side and extending in such a manner as to form an inclosed space between the disk 4 and the disk 7, and when the springs have first been entered into the pockets 9, they may be moved in the direction of the circumference of this hub portion, until they are inclosed between the projecting flanges 11 and the opposite side of the pocket thus formed. When in this position the spring is retained by pins, as at 12, so that it cannot again move outwardly without removing the bolts. By this construction it will be seen that the edges of the springs are supported against the flanges 11—4 and at a sufficient distance from the hub, so that the springs will have sufficient rigidity to resist any side thrust which would tend to buckle the wheel or displace the springs.

The outer ends of the springs are connected with shoes 13, which have channels formed in them in the line of the track 3, and these shoes fit upon the track and are capable of sliding thereon. The outer ends of the springs 6 are bent into a circular form similar to that shown at the inner ends, as plainly shown at 14. The shoes 13 have inwardly projecting lugs 15, with sockets into which the outer curved ends of the springs fit, and they may be introduced at the same time that the inner ends are introduced into the pockets 9 and are secured by pins 15ª. When these springs are all in place, the tension upon them is produced by bending the springs back until they lie in the chambers formed by the flanges 11 and are secured in this position by the bolts or pins 12. It will thus be seen that these springs may be readily removed by releasing them from their holding bolts or pins 12 and allowing them to move out of the pocket formed by the flanges 11, when they can be drawn sidewise out of place and others inserted, if desired. In order to regulate the tension of the springs to suit heavier loads, it is necessary to give them a greater curvature. This may be effected in various ways. In one way I have shown a polygonal sleeve 16 bored eccentrically and fitting upon the bolt 12. If it is desired to increase the tension, it is only necessary to turn this sleeve so that either of the sides which are formed on the greater eccentricity of the sleeve, will be brought into contact with the contiguous portion of the spring, thus forcing it farther back and increasing its tension. These flat sides form all necessary locks. A wheel being constructed in this way, power is applied by means of a motor of any suitable description to the hub and the inner portion of the wheel. The tendency of the power thus applied is to cause the shoes 13 to have a tendency to slide upon the track 3, but the length of these shoes and the frictional adherence caused by the tension of the spokes is sufficient, so that the tractive effort of the wheel is not materially affected, but the resiliency of these spokes is such that whenever a wheel rolling upon the ground comes in contact with an obstruction, the springs upon that side will momentarily yield, and absorb the shock by sliding downward on the track, while the opposing springs serve to return and maintain the wheel rim substantially central with the hub. Another advantage is that when upon rough going the wheels drop into depressions in the roadway, the instant yielding of the springs acts in a measure as a shock absorber, the wheel following inequalities in the road surface without materially affecting the position of the hub portion. It will thus be seen that the springs may yield to the shock of contact with an obstruction, while the sliding movement upon the rim track will permit the return of the springs to their original position. As the wheel continues to rotate, the successive pressure upon the remaining springs and shoes will cause these parts to gradually assume their normal relations with each other. In other words, the rim always has a creeping movement with relation to the central portion of the wheel, which, without impairing its efficiency, tends to relieve the wheels and the vehicle from the shocks of rough surfaces of the road.

The position of each pin 12 is in advance of a radial line drawn through the corresponding pocket 9 and the approximately straight portion of the springs lying within the hub will have a similar position. The curved portions of the springs, between the hub and the shoes 13, will thus be in advance of their attachments to the hubs, and when, in traveling over rough or irregular surfaces, the weight of the vehicle or load causes the spokes 6 to yield, they will act to push the shoes slightly and intermittently forward upon the track 3 and thus relieve the shock.

Having thus described my invention, what I claim and desire to secure by Letters Patent is—

1. In a wheel, the combination of an outer rim, and spring spokes connected thereto, of a hub comprising a solid center with separate radial chambers in its periphery, said hub having spaced side flanges, one of which is radially slotted at points with the slots extending from near the center of the hub through the outer edge of the flange, said hub having pockets segmental in cross-section formed in the bottom of said chambers at the inner ends of and connecting with said slots, said spring spokes being compressed and having inner ends fashioned to conform to and slip edgewise into said pockets, a cover plate for the slotted flange of the hub, and retaining pins extending between said flanges near the periphery and engaging the spokes to maintain them in their compressed position.

2. In a wheel, a hub consisting of a solid center and parallel flanges, one of which has a continuous disk and the other having radiating slots made in it, transverse, substantially radial webs connecting said disks, transverse, segmental pockets formed in the solid, central portion and in line with the slots, springs having their inner ends formed to fit said pockets and curved to lie between the disks, and retaining pins extending between the disks near the periphery, and an outer rim to which the springs are attached.

3. A wheel having an inner hub portion and an outer concentric tread portion, curved elastic springs between the hub and tread having substantially circular ends, pockets formed in the hub in which the inner circular ends of the spokes are fitted and retained, hub flanges between which the springs may be compressed, and pins maintaining the springs in their compressed position, and eccentric sleeves upon the pins, said sleeves having polygonal faces to rest against the springs.

In testimony whereof I have hereunto set my hand in the presence of two subscribing witnesses.

HARRY LEAP.

Witnesses:
 JOHN H. HERRING,
 F. E. MAYNARD.